US012651232B2

(12) United States Patent
Lionello et al.

(10) Patent No.:     US 12,651,232 B2
(45) Date of Patent:          **\*Jun. 9, 2026**

(54) PERMISSIONING AND DEPENDENCY MAPPING IN SUPPLY CHAIN MANAGEMENT

(71) Applicant: QMS TECHNOLOGIES INC., New Westminster (CA)

(72) Inventors: Scott Nicholas Dante Lionello, New Westminster (CA); Viatcheslav Ivanov, Langley (CA); Carlos Renato Salim Campos, Burnaby (CA); Serena Elramley, Vancouver (CA); Haitao Ma, Vancouver (CA)

(73) Assignee: QMS TECHNOLOGIES INC., Vancouver (CA)

( \* ) Notice: Subject to any disclaimer, the term of this patent is extended or adjusted under 35 U.S.C. 154(b) by 172 days.

This patent is subject to a terminal disclaimer.

(21) Appl. No.: 18/780,129

(22) Filed: Jul. 22, 2024

(65) Prior Publication Data

US 2024/0394656 A1      Nov. 28, 2024

Related U.S. Application Data

(63) Continuation of application No. 18/136,637, filed on Apr. 19, 2023, now Pat. No. 12,073,358, which is a
(Continued)

(51) Int. Cl.
*G06Q 10/087*          (2023.01)
*G06Q 30/08*          (2012.01)
(52) U.S. Cl.
CPC ........... *G06Q 10/087* (2013.01); *G06Q 30/08* (2013.01)

(58) Field of Classification Search
CPC ............................. G06Q 10/087; G06Q 30/08
(Continued)

(56)          References Cited

U.S. PATENT DOCUMENTS 7,430,523 B1      9/2008  Hkalidi
2002/0087440 A1      7/2002  Blair et al.
(Continued)

FOREIGN PATENT DOCUMENTS

WO          03094078 A1      11/2003

OTHER PUBLICATIONS

The Extended European Search Report and European search opinion issued by the European Patent Office for European Patent Application No. 21882232.8, dated Sep. 9, 2024.
(Continued)

*Primary Examiner* — Luna Champagne
(74) *Attorney, Agent, or Firm* — Myers Wolin, LLC

(57)          ABSTRACT

A method for permissioning part manufacturing is provided, the method including associating a first user with a first part manufacturing template, the part manufacturing template defining a first vendor for providing a first part associated with the first part manufacturing template. The method then receives an indication from the first user to assign permissions associated with the first part manufacturing template to a second user. The method then provides the second user with limited access to the first part manufacturing template, such that the second user can order instances of the first part from the first vendor. The method then accepts an order for an instance of the first part placed by the second user and records analytics in a database accessible by the first user related to the order placed by the second user.

23 Claims, 8 Drawing Sheets

Related U.S. Application Data continuation of application No. PCT/IB2021/000719, filed on Oct. 21, 2021.

(60) Provisional application No. 63/104,135, filed on Oct. 22, 2020.

(58) Field of Classification Search
USPC .......................................................... 705/28
See application file for complete search history.

(56) References Cited

U.S. PATENT DOCUMENTS

| | | | |
|---|---|---|---|
| 2005/0209732 A1* | 9/2005 | Audimoolam ......... | G06Q 10/06 |
| | | | 700/216 |
| 2006/0041518 A1 | 2/2006 | Blair et al. | |
| 2006/0190391 A1 | 8/2006 | Cullen et al. | |
| 2014/0018949 A1* | 1/2014 | Linton .................... | G06N 5/02 |
| | | | 700/99 |
| 2015/0269617 A1* | 9/2015 | Mikurak ............ | G06Q 30/0633 |
| | | | 705/14.54 |

OTHER PUBLICATIONS

International Search Report with Written Opinion issued for International Application No. PCT/IB2021/000719 mailed on Feb. 22, 2022.
Non-final Office Action issued by the USPTO for U.S. Appl. No. 18/136,637, dated Aug. 18, 2023.

* cited by examiner

PERMISSIONING AND DEPENDENCY MAPPING IN SUPPLY CHAIN MANAGEMENT

CROSS-REFERENCE TO RELATED APPLICATIONS

This application is a continuation of U.S. patent application Ser. No. 18/136,637, filed Apr. 19, 2023, which was a continuation of International Patent Application No. PCT/IB2021/000719, filed Oct. 21, 2021, which claims the benefit of U.S. Provisional Application No. 63/104,135, filed on Oct. 22, 2020, the entire contents of each of which are incorporated herein by reference.

FIELD OF THE INVENTION

The present invention relates to parts and assembly supply chains, and in particular, systems and methods for managing multi-tier supply chains and for permissioning parts manufacturing.

BACKGROUND

A supply chain is a system of organizations, people, events, information and resources involved in supplying a product or service to a customer. Supply chains can become particularly complex where there are many tiers of different entities involved.

While increased globalization of commerce has propelled supply chains to be used at an international level, this has also generated several new challenges such as the substitution of entities when certain entities become unable to fulfil their purpose. In existing systems, if a link in a supply chain for a manufacturer is broken, it could take weeks or months to repair that link, as a new supplier must be ramped up, potentially retooled, and new parts must be tested for compliance with end product requirements.

Further, because the new supplier is unlikely to be local to the manufacturer, sample parts typically must be shipped back and forth for approvals, which takes additional time. However, because of the large expense associated with tooling and ramping up a new supplier, and with the cost savings associated with a lean assembly line, backup suppliers are rarely ramped up for links in a supply chain, so long as the existing links are functional.

Further, if a link in a supply chain is broken, it often results in a complete loss of an upstream supply chain, since upstream supply chains are often owned, or controlled by, a mid-tier supplier. As such, if a manufacturer loses a supplier for a supplier for a mid-level sub assembly, or if a manufacturer chooses to switch suppliers, all components incorporated into that mid-level sub assembly may need to be resourced.

Typically, if a manufacturer would like to control more of their supply chain, they must manually make introductions between suppliers at different tiers of their supply chain. After such introductions are made, suppliers at different tiers interact directly, and no information about the provision of parts or services between tiers are available to the manufacturer. As such, after an introduction is made, a manufacturer may not know anything about quality statistics about parts provided between tiers of their supply chain, or about order quantities. It is therefore difficult to audit any part of the relationship.

This background information is intended to provide information that may be of possible relevance to the present invention. No admission is necessarily intended, nor should be construed, that any of the preceding information constitutes prior art against the present invention.

SUMMARY

A platform is described for realizing the potential of a core supply chain management system by mapping and tracking the dependencies/relationships between those solutions to manage the production of complex assemblies across many-tiered supply chains. There are two primary components to this project.

First is a dependency framework, which serves to process and store relationships between orders/parts in a supply chain management system. This can be seen as a graph database with all of the back-end systems and infrastructure required to support it. Introduction of a subset of the core order processing into a new node-based microservice architecture adds efficiency to supply chain management.

An engine implementing such graph computation and database library features can reduce the system requirement for a highly complex core of such a graph dependency engine. Such an engine may then allow for the storage of relationships between entities, including vendors, orders, and parts, in order to allow for complex querying of such relationships in the graph database, and to otherwise support the components required for implementation of the dependency framework.

Such a system may then allow for visualization of dependency graphs, and may allow linking of orders and parts as dependencies with a user interface workflow. Such a system may then be able to generate and provide alerts for order graphs that have warnings, and provide the ability for different parties to view differently permissioned portions of such a dependency graph.

Further, once dependencies are graphed in a production map, additional supply chain features may be provided, such as provision of supply chain redundancies and failover procedures. Such a production map may further provide additional information and analytics to parties having permission to view such information. Further, such a production map may allow users to permission part of their supply chain to third parties, or require their supply chain to use specified third parties to satisfy required dependencies. Finally, such a production map may be automatically generated by way of the dependency graphs created through an RFQ process. Such an RFQ process may be iterative, such that dependencies are populated throughout a supply chain using information provided in automatically generated dependency RFQs.

As a second component of the system and method, a part sharing and provisioning framework may be provided, which serves to allow process owners for manufacturing solutions (for parts/assemblies) to permission collaborating companies within their supply network to access and order those solutions directly from the source company. This allows assigned assemblers or integrators to draw in needed components from validated sources while providing complete visibility into the quality of the components and the status of those dependent orders. It also allows for the sharing of manufacturing solutions across many different assemblies and supply chains, creating a global "parts bin" from which to draw inputs.

As such, a method for permissioning part manufacturing is provided, the method comprising associating a first user with a first part manufacturing template, the part manufacturing template defining a first vendor for providing a first part associated with the first part manufacturing template. The method then receives an indication from the first user to assign permissions associated with the first part manufacturing template to a second user.

The method then provides the second user with limited access to the first part manufacturing template, such that the second user can order instances of the first part from the first vendor.

The method then accepts an order for an instance of the first part placed by the second user and records analytics in a database accessible by the first user related to the order placed by the second user.

In some embodiments, the analytics are not accessible by the second user.

In some embodiments, upon accepting an order placed by the second user, the first vendor delivers completed instances of the first part directly to the second user in accordance with the first part manufacturing template. In some such embodiments, the first part manufacturing template defines terms for any order placed by the second user.

The analytics may comprise statistics related to numbers of part revisions, delivery time, part conformance, and order conformance. In some such embodiments, the database includes data for all instances of the first part placed with the first vendor based on the first part manufacturing template regardless of which user placed a corresponding order, and the database is not accessible by the second user.

In some embodiments, statistics related to delivery time comprise statistics comparing actual delivery time to projected delivery time.

In some embodiments, the method further includes creating a production map for a primary part, process, or assembly. The method then generates a first part request for the primary part, process, or assembly, the first part request including permissions associated with the first part manufacturing template for at least one vendor company. The method further includes transmitting the first part request to the at least one vendor company and receiving, from the at least one vendor company, a bid for the first part request, the bid specifying at least one dependency, the at least one dependency comprising the first part not provided by the at least one vendor company.

The method then incorporates the at least one dependency into the production map and assigns details for the at least one dependency based on the first part manufacturing template and generates a bid for manufacturing of the primary part, process, or assembly, the bid including the details for the at least one dependency from the first part manufacturing template.

In some such embodiments the first part request is an RFQ, an RFP, or a request for tender.

An alternative method is provided for resolving manufacturing dependencies. Such a method includes creating a production map for a primary part, process, or assembly.

The method then generates a first part request for the primary part, process, or assembly and transmits the first part request to at least one vendor company. The method then receives, from the at least one vendor company, a preliminary bid for the first part request, the bid specifying at least one dependency, the at least one dependency comprising a secondary part, process, or assembly not provided by the at least one vendor company.

The method then incorporates the at least one dependency into the production map, assigns a value to the at least one dependency, and generates a bid for manufacturing of the primary part, process, or assembly, the bid including the value for the at least one dependency.

In some embodiments, upon acceptance of the bid by a purchaser, the method generates a secondary part request associated with any of the at least one dependency that has not been resolved. The method then includes transmitting the secondary part request to at least one additional vendor company, receiving, from the at least one additional vendor company, a bid for the secondary part request, and incorporating details associated with the bid for the secondary part request into the production map. The method then replaces the value previously assigned to the dependency with a value drawn from the corresponding bid.

In some such embodiments, the bid previously generated in response to the first part request remains valid after replacing the value previously assigned to the dependency. In some such embodiments, the bid for the secondary part request specifies at least one secondary dependency.

The at least one secondary dependency includes a tertiary part, process, or assembly, and the method further includes assigning a value to the at least one secondary dependency. The value assigned to the at least one secondary dependency is then included in the bid for the secondary part request, and the details associated with the tertiary part, process, or assembly are incorporated into the production map.

In some embodiments, part requests are generated for any secondary dependencies specified, and bids are received in response to each such part request, and the process repeats until bids are received without any further dependencies.

In some embodiments, values assigned to dependencies are drawn from databases of publicly available options for parts, processes, or assemblies corresponding to the secondary part, process, or assembly. In some embodiments, the value assigned to the dependency is based on a bid in response to a part request issued by the at leas tone vendor company.

In some such embodiments, the value drawn from the database is automatically incorporated into the production map where parameters of the dependency correspond to parameters associated with the value in a database record.

In some embodiments, the first part request identifies a provider for the secondary part, process, or assembly, and the corresponding dependency is resolved by the provider for the secondary part, process, or assembly.

In some such embodiments, the secondary part, process, or assembly is specified in a first part manufacturing template, the part manufacturing template defining the provider for the secondary part, process, or assembly, and wherein the part request includes permissions to be granted to the at least one vendor company to order the secondary part, process, or assembly from the provider based on the part manufacturing template, and wherein the details associated with the first part manufacturing template are incorporated into the production map.

In some embodiments, the production map identifies the primary part, process, or assembly, the at least one dependency of the first bid comprising a secondary part, process, or assembly, and at least one secondary dependency included in a bid for a secondary part request associated with the secondary part, process, or assembly, the at least one secondary dependency comprising a tertiary part, process, or assembly. In such an embodiment, a party associated with the first part request is provided with access to all contents of the production map, a vendor associated with the first part request has access to the secondary part, process, or assembly and the tertiary part, process, or assembly, and a secondary vendor associated with the secondary part request has access to the tertiary part, process, or assembly, but the secondary vendor does not have access to the secondary part, process, or assembly in the production map.

In some embodiments, the first part request is an RFQ, an RFP, or a request for tender. In some such embodiments, the secondary part request is an offer for tender.

In some embodiments, the created production map defines a primary part, process, or assembly, provided by the at least one vendor company, and at least one secondary part, process, or assembly provided by a secondary vendor different than the at least one vendor company, and wherein, upon receiving an indication that the secondary vendor cannot provide the secondary part, process, or assembly, generating a secondary part request for the secondary part, process, or assembly, and transmitting the secondary part request to as least one tertiary vendor.

In some embodiments, the created production map defines a primary part, process, or assembly, provided by the at least one vendor company, and at least one secondary part, process, or assembly provided by a secondary vendor different than the at least one vendor company, and the created production map further defines at least one tertiary vendor capable of providing the at least one secondary part, process, or assembly. Upon receiving an indication that the secondary vendor cannot provide the secondary part, process, or assembly, the secondary vendor is replaced with the tertiary vendor in the created production map.

DETAILED DESCRIPTION OF THE PREFERRED EMBODIMENTS

Figure 1:
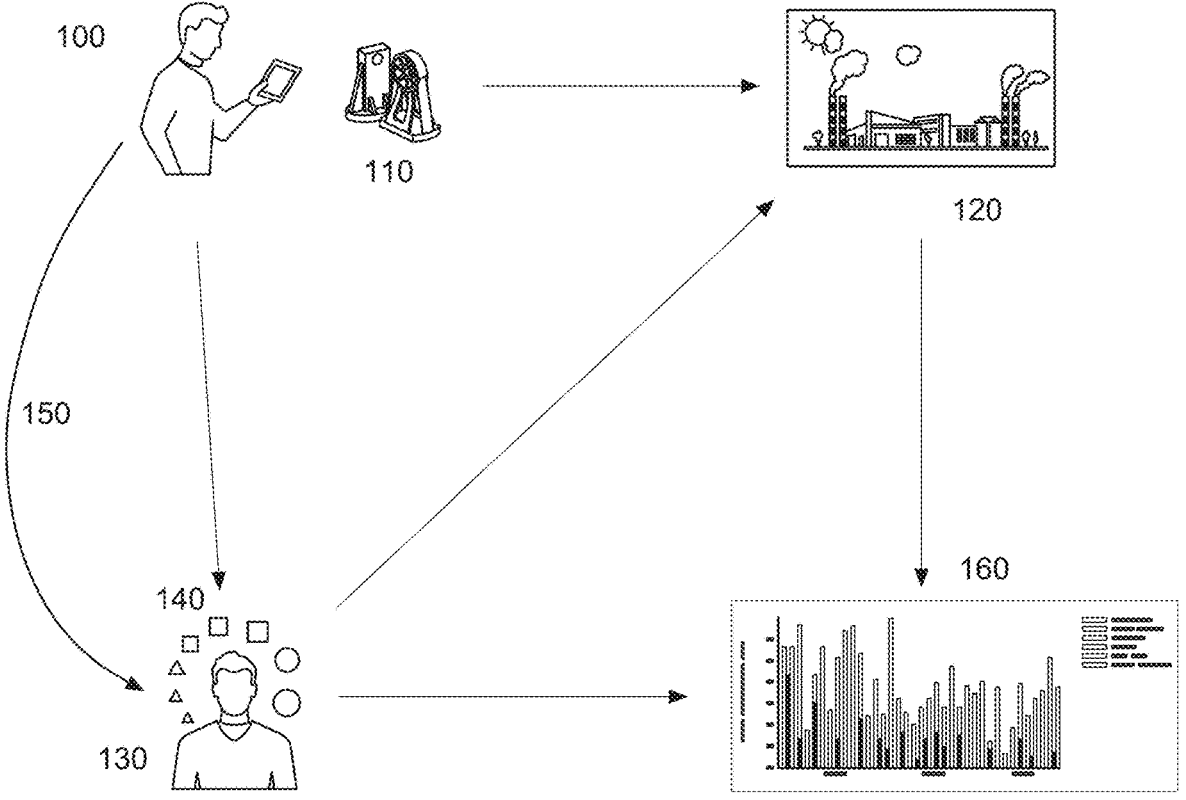
FIG. 1 illustrates a part sharing overview, in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates a part sharing overview, in accordance with this disclosure. As shown, a first user 100 creates a product 110 with a vendor company 120. That product is typically described herein as a part, but it may also be a process or assembly. The product 110, as well as associated manufacturing details are then recorded in a manufacturing template associated with the first user 100.

If the first user 100 wishes to share the product 110 with a second user 130, the first user may then grant permission to the second user to leverage the manufacturing template for the product 110. The second user 130 may then use the manufacturing template to engage the vendor company 120 to manufacture the product 110.

When the second user 130 engages the vendor company 120 in this way, the relationship generates order statistics 140, which are typically viewable by the first user 100. As such, when the second user 130 orders parts by way of a manufacturing template "owned" by the first user 100, the first user can view 150 details of those orders.

Further, the manufacturing process executed by the vendor company 120 on behalf of the second user 130 typically generates quality analytics data 160. This data 160 may include, for example, data related to number of part revisions, delivery time, part conformance, and order conformance. The data 160 may further include non-conformance reports (NPR) that can be viewed by the first user 100 independently of statistics generated based on the data 160.

Typically, the quality analytics data 160 is stored in a database, and may be viewable by the first user 100. In some embodiments, the quality analytics data 160 is combined with comparable quality analytics data 160 for manufacturing directly authorized or ordered by the first user 100, such that all parts permissioned by way of the manufacturing template contribute to a combined robust data set for analyzing quality of the vendor company's 120 manufacturing capabilities.

In this way, a first user 100 may maintain control of manufacturing processes, and may continue to monitor manufacturing quality, even if they are separated from those processes by multiple tiers of a supply chain, as discussed in more detail below.

Further, when assigning permissions to a second user 130, the first user 100 may limit those permissions to, for example, a limited number of parts, limited revisions, and limited abilities to share further.

Figure 2:
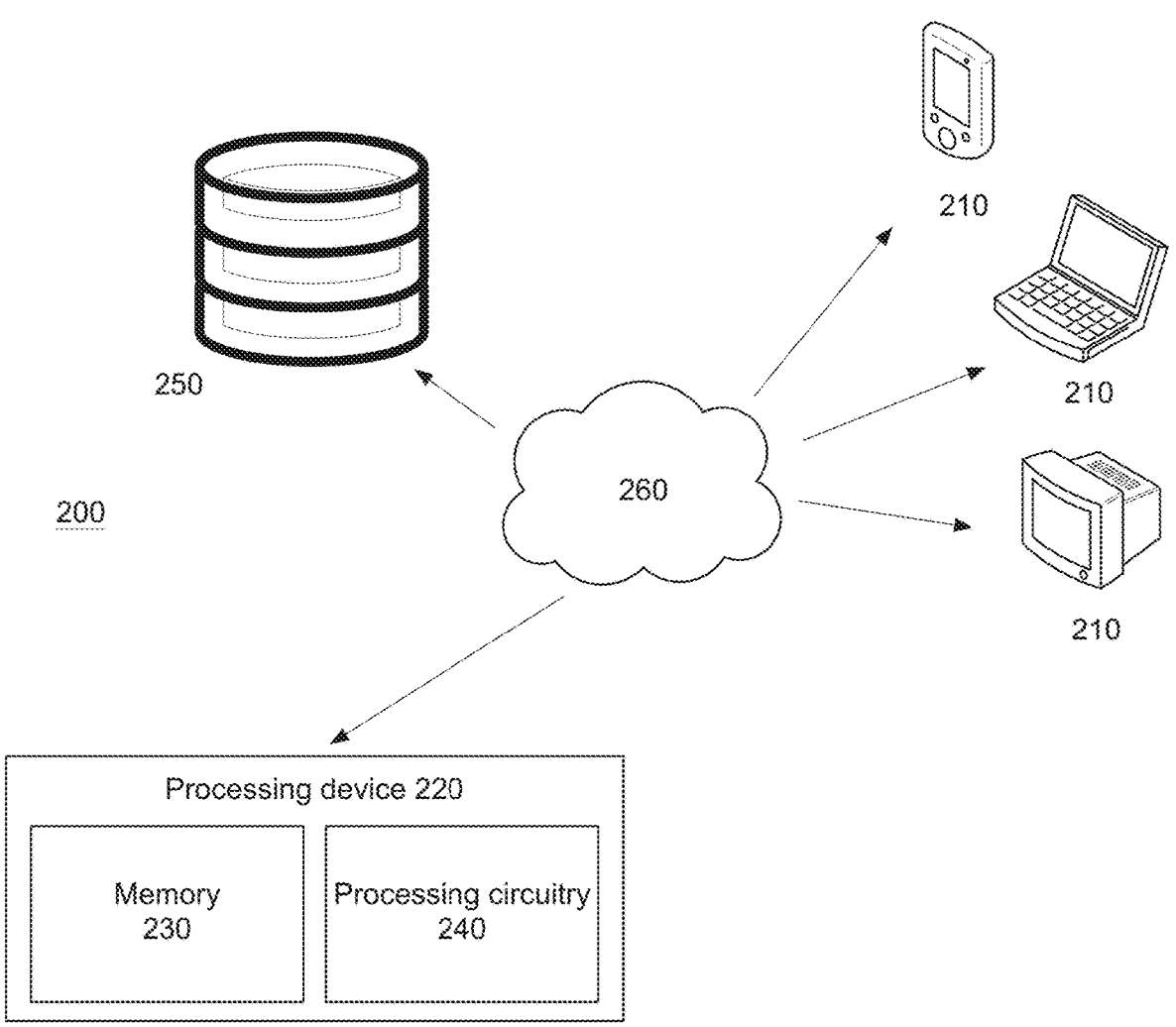
FIG. 2 shows a system for implementing the parts sharing framework and for generating production maps in accordance with this disclosure.

FIG. 2 shows a system 200 for implementing the parts sharing framework and for generating production maps in accordance with this disclosure. As shown, the system 200 may comprise a plurality of user interface devices 210 used by the first user and the second user to access the system and a processing device 220, such as a server for implementing the methods described herein.

The processing device 220 typically includes a memory 230 and processor circuitry 240. The memory 230 stores a plurality of instructions for executing the described methods, and the processor circuitry 240 is linked to the memory and executes those instructions.

The processing device 220 may further comprise or be linked to one or more databases 250 for storing data associated with the methods described herein. The user interface devices 210 may be computers accessible by users, including laptop computers, smartphones, and tablet computers, and may be connected to the processing device 220 by way of a network connection. Such network connection may be, for example, the internet 360.

Figure 3:
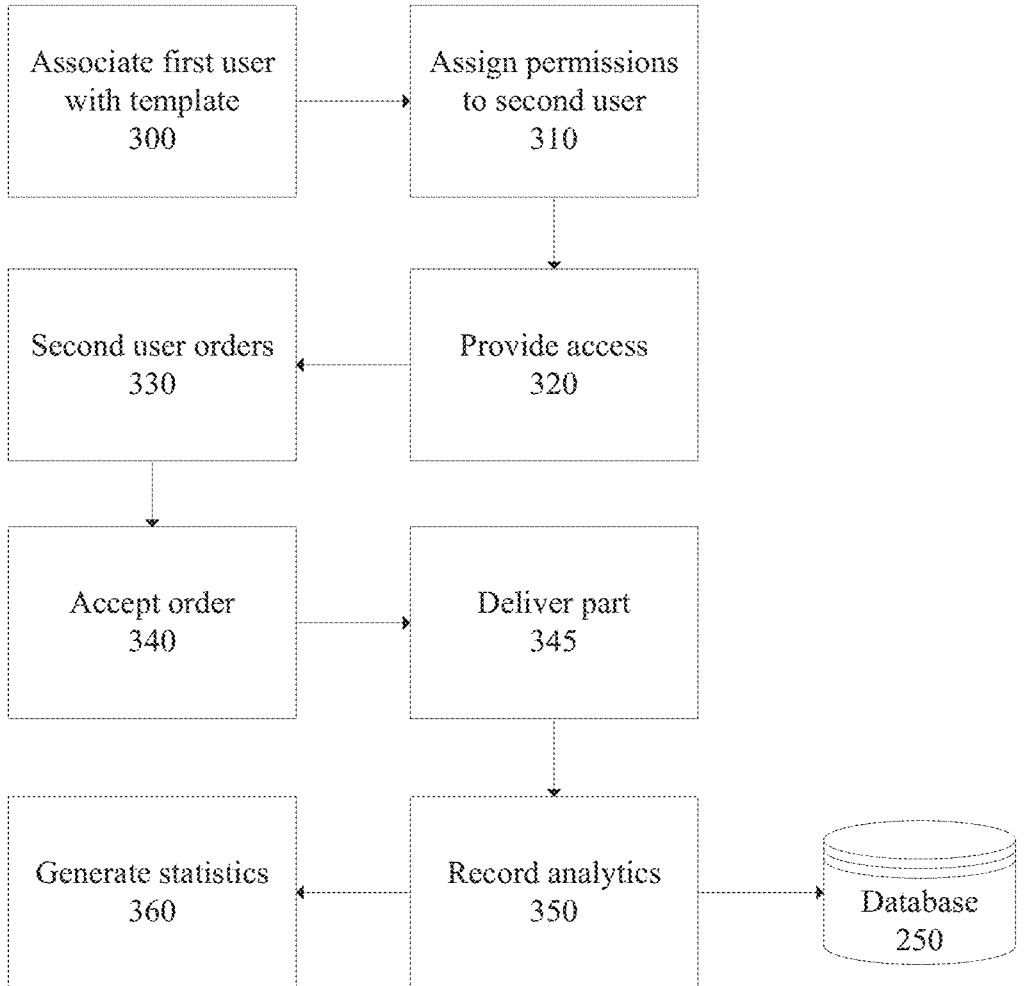
FIG. 3 is a flowchart illustrating a method for permissioning part manufacturing in accordance with this disclosure.

FIG. 3 is a flowchart illustrating a method for permissioning part manufacturing in accordance with this disclosure. As shown, and as noted above, a system 200 implementing the method initially associates a first user 100 with a part manufacturing template for the product 110 to be shared (at 300). The part manufacturing template defines a vendor 120 for providing the product 110, in this example a part, associated with the part manufacturing template.

The system 200 then receives an indication from the first user 100 to assign permissions associated with the part manufacturing template associated with the part 110 to a second user 130 (at 310). The indication may be received at a user interface device 210 associated with the first user 100.

The system 200 then provides the second user 130 with limited access to the part manufacturing template for the part 110 (at 320) in accordance with the permissions assigned by the first user 100. The second user may then order (at 330) instances of the part 110 from the vendor 120 defined in the part manufacturing template.

The system 200 then accepts (at 340) an order for an instance of the part 110 placed by the second user 130. This acceptance may be at the processing device 220 if the vendor 120 has delegated the right to accept new orders, or it may be by the vendor 120 at an associated user interface device 210.

In some embodiments, after the second user 130 places an order (at 330), and the vendor 120 accepts the order (at 340), completed instances of the part 110 are delivered (345) directly to the second user 130 in accordance with the manufacturing template. Further, the manufacturing template may define terms for orders placed by the second user 130.

During and following fulfillment of the order placed by the second user 130 and accepted by the vendor 120, the system 200 may record analytics at a database 250 (at 350) accessible by the first user 100, and related to the order placed by the second user 130. These analytics may be order statistics 140 for orders placed by the second user. Alternatively, or in addition, these analytics may be quality analytics 160 associated with manufacturing of the part by the vendor 120.

In some embodiments, the analytics recorded are then used to generate statistics (at 360) for use by the first user

100. In some embodiments, the analytics or the resulting statistics are accessible by the first user 100 but are not accessible by the second user 130. The analytics and resulting statistics discussed herein may comprise, for example, statistics related to numbers of part revisions and delivery time. Such delivery time statistics may include, for example, statistics comparing actual delivery time to projected delivery time for the vendor 120.

As discussed above, the database 250 may include data for all instances of the part 110 placed with the vendor 120 based on the part manufacturing template, regardless of which user 100, 130 placed the corresponding order. Further, if the user 100 granted permissions to additional users other than the second user 130, analytics associated with parts 110 manufactured under those permissions may be included in the database 250 as well. In some embodiments, the database may be accessible by the first user 100, but not by the second user 130.

As discussed in more detail below, the parts sharing method described herein may be used to share parts for use in the first user's 100 supply chain that are not directly managed by the first user. As such, if the first user 100 has developed a part 110 with a second tier manufacturer and issues a request for quote (RFQ) to first tier manufacturers, the first user 100 may require any vendors responding to the RFQ to leverage the developed part 110 from the corresponding vendor 130 when resolving dependencies in their own quote. This is discussed in more detail below.

It is noted that while the general discussion provided herein is in terms of requests for quotes (RFQs), the method may be applied similarly using requests for proposals (RFPs) and in some cases, requests for tender. In the case of an RFP, a vender may be provided with additional latitude to propose specifications or modifications to existing specifications, while a request for tender may specify everything, including a price, and a vendor receiving such a request for tender may respond by simply indicating if the proposed specifications and price are acceptable.

Figure 4:
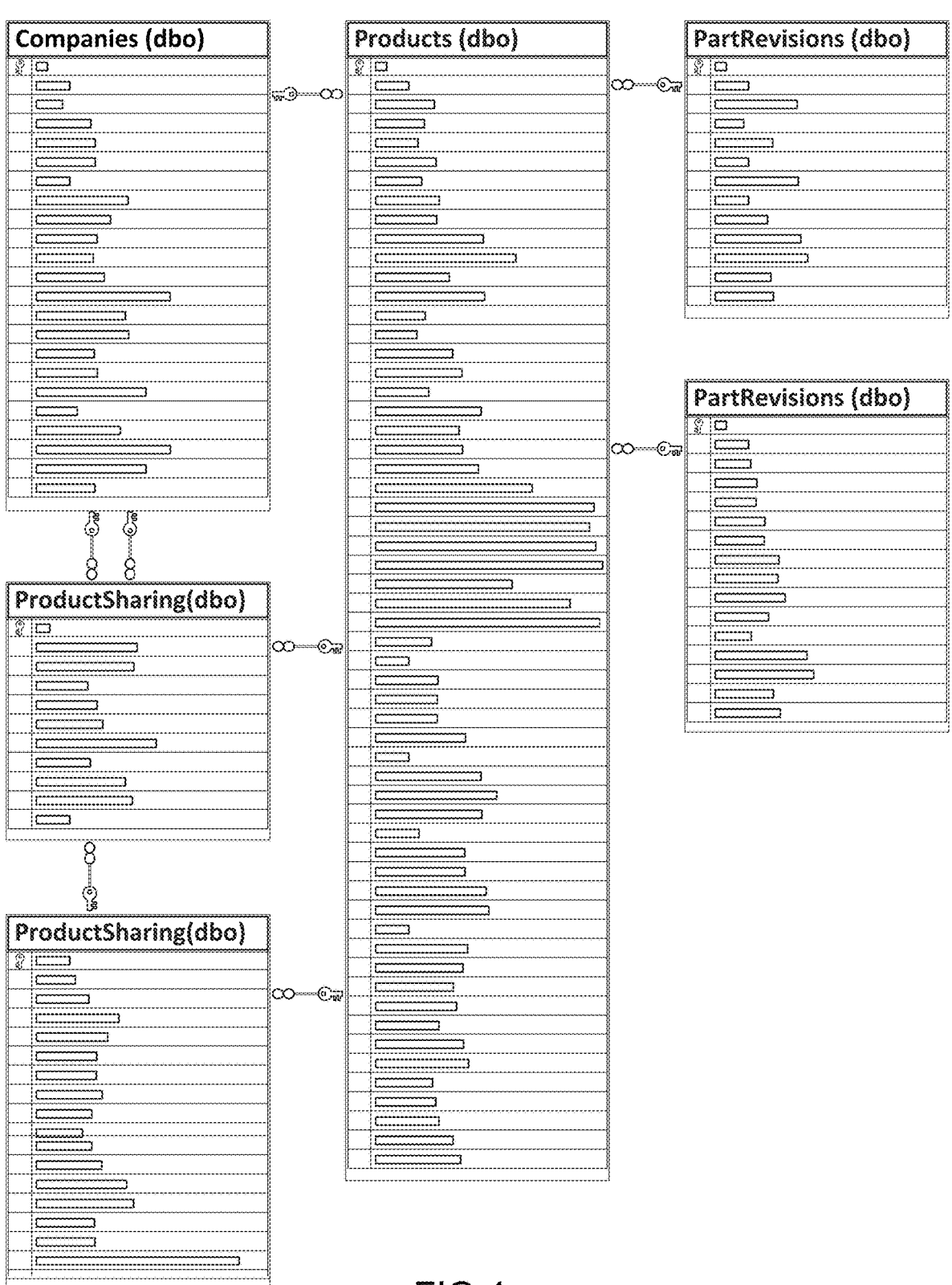
FIG. 4 shows a database diagram for providing permissioning functionality in accordance with this disclosure.

FIG. 4 shows a database diagram for providing permissioning functionality in accordance with this disclosure. As shown, a product sharing module may be associated with various products and vendors, and may control permissioning of task data associated with shared products.

Figure 5:
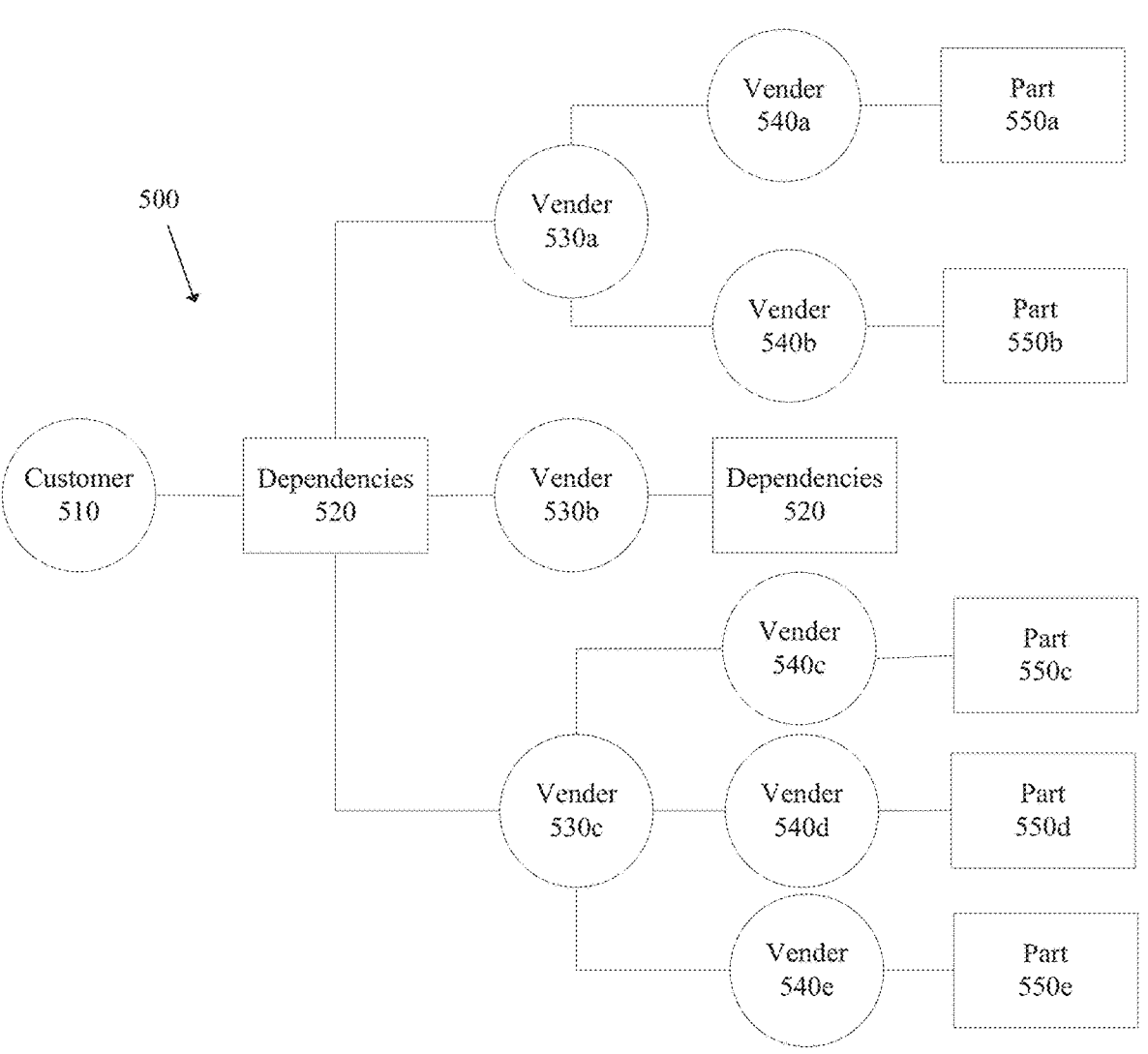
FIG. 5 is a sample production map for manufacturing a part in accordance with this disclosure.

FIG. 5 is a sample production map 500 for manufacturing a part in accordance with this disclosure. As shown, a customer 510 may identify a number of products to be produced by issuing corresponding RFQs for dependencies 520. As noted above, while RFQs are discussed here, any form of part request may be used, including RFPs and requests for tender. Dependencies 520 generally describe a part, process or assembly needed to deliver a completed part or assembly.

In some cases, the customer 510 may seek a vendor to prepare a complete product, and may therefore only identify a single "dependency," which in that case would be the completed product. In such a case, the customer 510 may issue a single RFQ, and a vendor 530*a-c* responding to such an RFQ may then identify underlying dependencies 520. However, in the example shown, the customer 510 has identified multiple dependencies 520. This may be, for example, when the customer 510 is completing final assembly internally, such as when the customer is itself a manufacturer.

The system 220 discussed above may process the dependencies 520 identified by the customer 510 and may generate corresponding RFQs. The RFQs may take the form of a template to be completed by the customer, or may be fully automated based on the particular dependency identified. These created RFQs may then be distributed to various first tier vendors 530a-c.

The first tier vendors 530a-c may be able to provide some services required by the received RFQs, but may have further dependencies that must be resolved. In the production map 500 shown, certain vendors 530a, c have resolved all dependencies, and are thereby linked to second tier vendors 540a-e. Each second tier vendor 540a-e may then be responsible for a single corresponding part 550a-e which may be delivered to the corresponding first tier vendor 530a, c. Other vendors 530b continue to have unresolved dependencies 520 in the production map 500.

While this description of the production map 500 assumes that products from all of vendors 530a-c are required to complete the customer's 510 product, a related case may be a customer 510 having a single product requirement and issuing multiple RFQs taking the form of dependencies 520 to alternative first tier vendors 530a-c.

In such a scenario, each first tier vendor 530a-c may provide a bid in response to a received RFQ. As such, bids from first tier vendors 520a, c may have all dependencies resolved, and may therefore be able to provide a complete bid in response to the RFQ from the customer 510. In contrast, the first tier vendor 520b may provide a bid containing several unresolved dependencies 520. As discussed in more detail below, the unresolved dependencies may be estimated by the vendor 520b, may be drawn from a database of publicly available products or services 250, or may be satisfied using a part manufacturing template provided by the customer 510. In some embodiments, a vendor 530a-c may fully resolve all dependencies by preemptively issuing RFQs to second tier vendors 540a-e.

Figure 6:
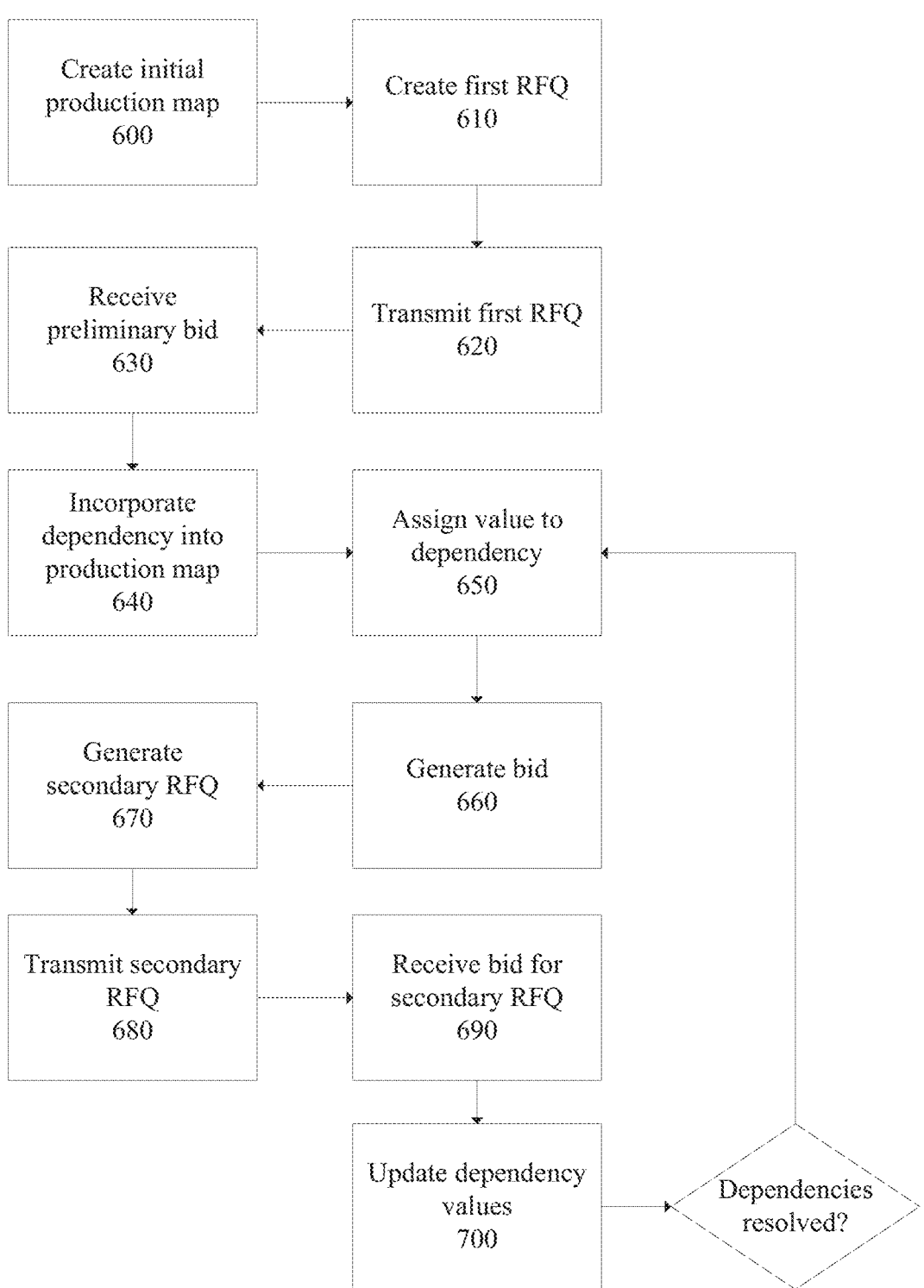
FIG. 6 is a flowchart illustrating a method for resolving manufacturing dependencies in accordance with this disclosure.

FIG. 6 is a flowchart illustrating a method for resolving manufacturing dependencies in accordance with this disclosure.

As shown, the system 200 initially creates an initial production map (600) for a primary part, process, or assembly.

The initial production map, created at 600, may simply be an initial indication of the primary part, process, or assembly, along with details required to generate a corresponding RFQ. The system 200 then generates a first RFQ for the corresponding part, process, or assembly (610) and transmits the RFQ to at least one vendor company 530a-c (620). The vendor company 530a-c may be selected by a customer 510 initiating the process, or it may be selected by the system 200 itself. In some embodiments, the system 200 may propose several appropriate vendor companies 530a-c, and the customer 510 may then choose one or more of the proposed companies to receive RFQs.

After transmitting the first RFQ to at least one vendor company 530a-c (at 620), the system may then receive, from the at least one vendor company, a preliminary bid for the first RFQ (630). The bid specifies at least one dependency 520, the at least one dependency comprising a secondary part, process, or assembly, not to be provided by the at least one vendor company 530a-c. The dependencies identified in the bid may be resolved, in that they may be assigned to a second tier vendor 540a-e, or they may be unresolved, and may require additional RFQs, or additional content in order to complete the production map 500.

While generally discussed in terms of manufacturing parts for ease of understanding, the primary part or any given dependency may require completion of a process or provision of a complete assembly. For example, the dependency may be for a sub-assembly, or creating raw material required for a part, such as a required extrusion. It may similarly be for machining, coating, or anodizing a part. It may similarly be the preparation of circuit boards, such as PCBs, required for preparing chips for a subassembly.

All dependencies 520 identified in any bids received in response to the first RFQ are then incorporated (640) into the production map 500. A value is then assigned (650) to all dependencies. In cases where dependencies are resolved, such a value may be drawn from an actual second tier vendor 540a-e engaged as part of the initial RFQ to complete the work. Where dependencies are not resolved, a vendor 530a-c submitting a bid may apply a value based on their own expertise. In some embodiments, the vendor 530a-c may satisfy a dependency 520 using a publicly available part listed in a parts database 250. In other embodiments, the system 200 may provide an estimated value. In yet other embodiments, a value for the dependency 520 may be drawn from a part manufacturing template provided by the customer 510 and requiring the vendors 530a-c to utilize a predefined vendor for such a dependency.

After values are assigned for all dependencies 520, the system 200 generates a bid (660) on behalf of the vendor 530a-c including the value of the at least one dependency, whether that dependency has been resolved or not.

Upon acceptance of a bid generated in this fashion by a customer 510, the system 200 may proceed to generate secondary RFQs associated with each dependency that has not yet been resolved (670). The system 200 then transmits (680) the secondary RFQ to at least one additional vendor company 540a-e, and receives (690), from each such additional vendor company, a bid for the secondary RFQ.

After receiving bids for each secondary RFQ (at 690), the system 200 incorporates details associated with the corresponding bids into the production map 500 and replaces (700) any values previously assigned to the corresponding dependency with a value drawn from the bid corresponding to the secondary RFQ.

It is noted that while values for dependencies may be updated, and details associated with that portion of the supply chain may be updated, a bid previously generated in response to the first part may remain valid after replacing the value previously assigned to the dependency. Accordingly, a bid generated with unresolved dependencies would typically remain valid. Alternatively, in some embodiments, a bid generated earlier may be invalidated if a value for a dependency changes by more than a threshold amount. Accordingly, if a dependency changes a bid drastically, a vendor may have an opportunity to update the corresponding bid.

In some embodiments, the bids responsive to the secondary RFQs may include at least one secondary dependency which would require a tertiary part, process, or assembly, to resolve. The method would then return to step 640 to incorporate details of the required tertiary part, process, or assembly, and to assign values for all secondary dependencies (at 650) and generate a bid (at 660) responsive to the secondary RFQ incorporating the values assigned to any secondary dependencies.

Tertiary RFQs are then generated (at 670) for any unresolved dependencies, and are transmitted (at 680) to additional vendor companies. This process repeats until bids are received without any further dependencies.

In some embodiments, where values drawn from a database of publicly available options for parts, processes, or assemblies, may be assigned to dependencies, such values and the corresponding parts may be selected by a vendor 530a-c, 540a-e in order to satisfy unresolved dependencies. In other embodiments, a value drawn from the database of publicly available options may be automatically incorporated into the production map where parameters of the dependency correspond to parameters associated with the value in a database record.

In some embodiments, as discussed above, the RFQ issued by, or on behalf of, the customer 510 (at 610) may identify a provider for a secondary part, process, or assembly required for manufacturing the primary part, process, or assembly. In such a scenario, at least one of the dependencies 520 is resolved by the provider of the secondary part, process, or assembly.

In some such scenarios, the secondary part, process, or assembly is specified in a part manufacturing template, the part manufacturing template defining the provider for the secondary part, process, or assembly. The RFQ issued (at 610), may then include permissions to be granted to the at least one vendor company to order the secondary part, process, or assembly from the provider based on the part manufacturing template. Details associated with the part manufacturing template may then be automatically incorporated into the production map 500.

While such permissioning is described in the context of the customer 510, it will be understood that first tier vendors 530a-c may themselves have secondary parts that they have developed for inclusion into parts manufactured by third tier vendors 540a-b. As such, RFQs issued by first tier vendors 530a-c may similarly include permissions for corresponding part manufacturing templates, and may be used to resolve upstream dependencies.

In some embodiments, permissions for the part manufacturing template are granted only upon acceptance of a bid in response to an RFQ.

In some embodiments, different parties associated with manufacturing may have different viewing permissions for the production map 500 developed in accordance with the method described. As such, the production map typically identifies the primary part, process or assembly, at least one dependency of a first bid comprising a secondary part, process, or assembly, and at least one secondary dependency included in a bid for a secondary RFQ associated with the secondary part, process, or assembly, where the secondary dependency comprises a tertiary part, process, or assembly.

A party associated with the first RFQ, such as the customer 510, may have access to all contents of the production map 500, while a vendor 530a-c associated with first RFQ has access to the secondary part, process, or assembly and the tertiary part, process, or assembly. In other words, the vendor 530a-c has access to upstream portions of the production map 500.

Similarly, a secondary vendor 540a-e has access to the tertiary part, process, or assembly 550a-e, but not the secondary part, process, or assembly downstream from their own position in the production map 500.

In some embodiments, the production map 500 may define a primary part, process, or assembly, provided by the at least one vendor company 530a-c, and at least one secondary part, process, or assembly, provided by a secondary vendor 540a-e different than the at least one vendor company. In such an embodiment, the secondary vendor may fail to provide the secondary part, process, or assembly. Upon receiving an indication, at the system 200, that the secondary vendor 540a-e has failed to deliver, and cannot provide the secondary part, process, or assembly, the system may generate a new secondary RFQ for the secondary part, process or assembly, and transmit the secondary RFQ to a tertiary vendor. This allows the system 200 to repair a broken supply chain using the production map 500.

As discussed above, although discussed in terms of RFQs in this disclosure, the part requests may take the form of RFQs, RFPs, or offers for tender. In some embodiments, in a failover scenario, the initial part requests may be RFQs, while the request generated when the supply chain breaks may be a request for tender. As such, when the supply chain breaks, a request may go out to multiple venders asking which are willing to fulfill the order with proposed specifications at a proposed price.

In some embodiments, the production map 500 may define at least one tertiary vendor capable of providing the at least one secondary part, process, or assembly as a backup vendor. In such a scenario, upon receiving an indication that the secondary vendor 540a-e cannot or will not provide the secondary part, process, or assembly, the system 200 can replace the secondary vendor 540a-e with the tertiary vendor in the created production map 500 so as to minimize downtime during a changeover.

This potential redundancy and failover mapping can reduce downtime by having backup options ready to be slotted in during manufacturing of sophisticated products.

Figure 7A:
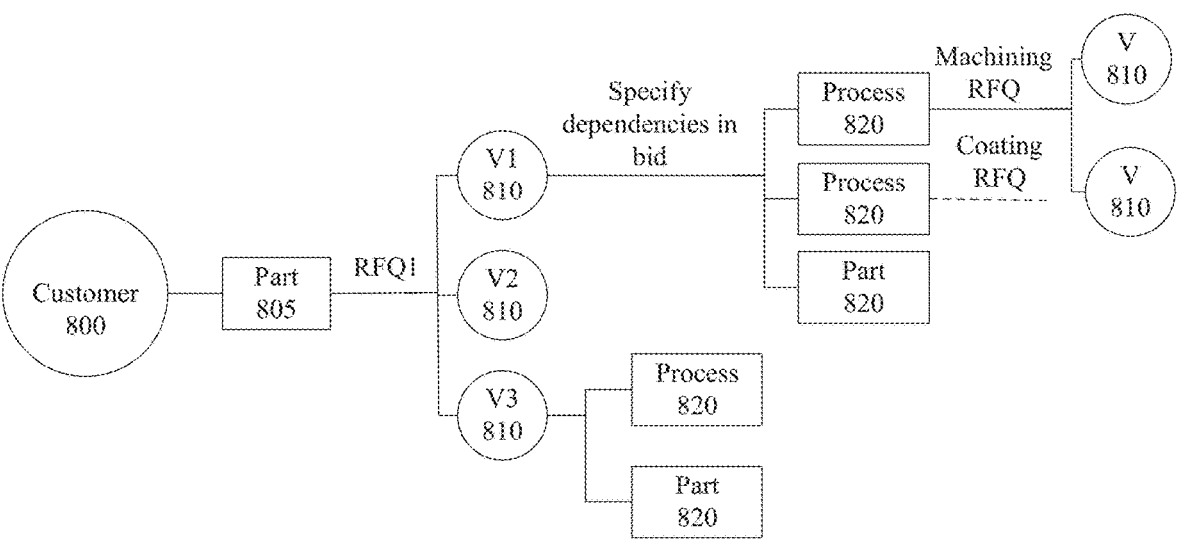
FIG. 7A illustrates an RFQ graph illustrating an ASK process, in accordance with this disclosure.

FIG. 7A illustrates an RFQ graph illustrating an ASK process, in accordance with this disclosure. During an ASK type RFQ process, a customer 800 may request a bid for a part 805. An RFQ may then be distributed for the same part to three distinct prospective suppliers, or vendors 810. The vendors 810 must then declare the number of dependencies 820, including outside processes or parts, that will be leveraged to complete their manufacturing solution. Those will be entered as unsolved dependencies 820 which must be sourced and managed by the system if that particular vendor win the project assignment. Fewer dependencies 820 typically mean that the vendor 810 can get more done in house. In the example shown, vender 810 V1 has three unsolved dependencies 820 that must be resolved, which results in two RFQs for processes (in this case machining and coating) and one RFQ for a part.

This ask process repeats until no outside processes or sub parts are found. In the case of a complex extruded and machined part, such as that shown in FIG. 8, there may be multiple sub processes upstream of a machine shop. For example, a part may require an extrusion house, and an anodizing house. The system may also generates share instances using the methods described above with respect to FIG. 4 in order to grant the process owner access to buy the raw extrusion and anodizing jobs so they can be maintained in the event that a particular vendor is removed from the supply chain.

Figure 7B:
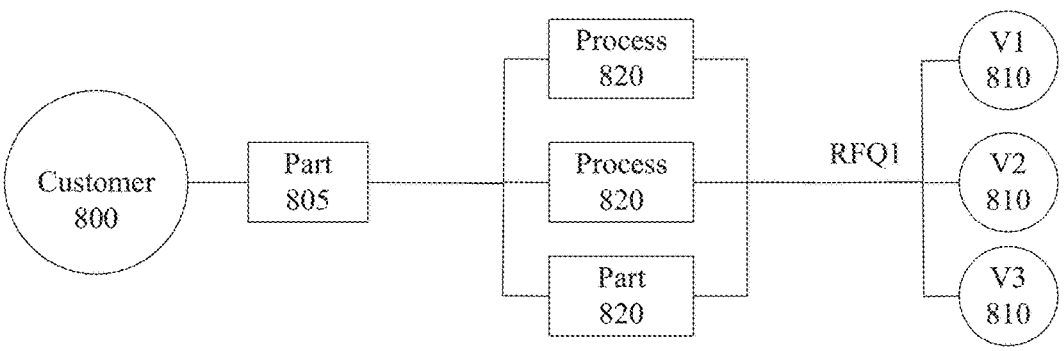
FIG. 7B illustrates an RFQ graph illustrating a TELL process, in accordance with this disclosure.

FIG. 7B illustrates an RFQ graph illustrating a TELL process, in accordance with this disclosure. When looking for assemblers or integrators under the TELL method, it is necessary to provide all potential vendors with a BOM driven list of custom and already sourced components that they must source from already arranged suppliers. This may be a vendor 140 specified in a part manufacturing template, as in the scenarios discussed above.

In such a scenario, a part request from a potential vendor, such as an RFQ, may identify the vendor for a secondary part, process, or assembly, necessary to resolve a dependency in the supply chain. When developing the production map discussed above, this dependency is then resolved by the vendor specified in the initial part request. This specification may take the form of a part manufacturing template, such as that discussed above, which would then define the provider. The RFQ may then include permissions to be granted to the potential vendor to allow them to order the secondary part, process, or assembly from the provider based on the part manufacturing template. In such a scenario, details associated with the part manufacturing template are then incorporated into the production map.

In some embodiments, when the part manufacturing template is incorporated into an RFQ, information required to formulate the rest of the vendor's bid may be provided with it. Additional access may then be withheld initially, and provided once a bid from that vendor is accepted. The dependencies of the parts to the assembly are then generated along with the shares, completing the map of the network down to the end of the "ask" chains.

Figure 8:
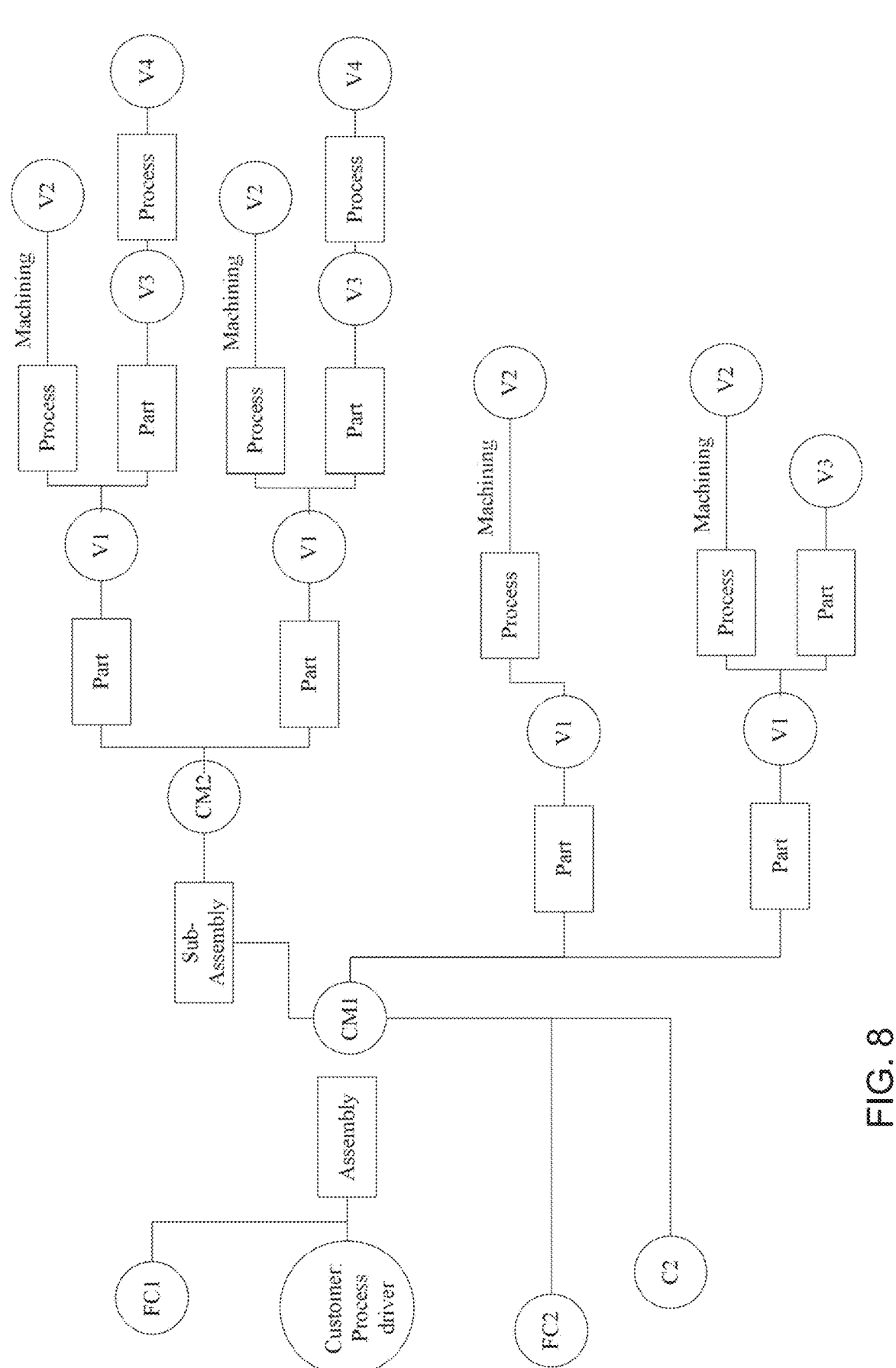
FIG. 8 shows a more complex order, in accordance with this disclosure.

FIG. 8 shows a more complex order, in accordance with this disclosure. As shown, the ASK and TELL methods can be repeated until a complete production map is developed for a supply chain.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The embodiments of the invention disclosed herein may comprise a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Perl, Python or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A processor or processor circuitry may include a device that has any combination of hardware, circuitry, and software. The hardware and circuitry examples may comprise a parallel processor, a processor array, a vector processor, a scalar processor, a multi-processor, a microprocessor, a communication processor, a network processor, a logic circuit, a queue management device, a central processing unit (CPU), a microprocessing unit (MPU), system on a chip (SoC), a digital signal processor (DSP), an integrated circuit (IC), an application specific integrated circuit (ASIC), a programmable logic device (PLD), and a field programmable gate array (FPGA). A processor or processor circuitry may include one or more processors, one or more circuits and/or software, that responds to and processes basic computer instructions and carries out the instructions of a computer program by performing the basic arithmetic, logical, control and input/output (I/O) operations specified by the instructions, one or more of: an arithmetic logic unit (ALU), which may carry out arithmetic and logic operations on the operands in instructions; a floating point unit (FPU), also known as a math coprocessor or numeric coprocessor, which is a specialized coprocessor that may manipulate numbers more quickly than the basic microprocessor circuitry can in some cases; one or more registers, which may hold instructions and other data and supply operands to the ALU and store the results of operations; and cache memory, which may save time compared to having to get data from random access memory (RAM). A processor or processor circuitry may also include one or more circuits comprising electronic components, such as resistors, memristors, power sources, magnetic devices, motors, generators, solenoids, microphones, speakers, transistors, capacitors, inductors, diodes, semiconductors, switches, antennas, transducers, sensors, detectors, vacuums, tubes, amplifiers, radio receivers, crystals, and oscillators connected by conductive wires or traces through which electric current can flow. The combination of components and wires may allow various simple and complex operations to be performed: signals may be amplified, computations can be performed, and data can be moved from one place to another.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for permissioning part manufacturing, the method comprising:

creating an initial production map for a primary part, process, or assembly, the initial production map comprising a graph database;

associating a first user at a first user interface device with a first part manufacturing template stored in a second database, the part manufacturing template defining a first vendor for providing a first part associated with the first part manufacturing template;

receiving an indication from the first user interface device to assign permissions associated with the first part manufacturing template to a second user at a second user interface device;

providing the second user interface device with limited access to the first part manufacturing template in the second database, such that the second user can order instances of the first part from the first vendor;

receiving, from the second user interface device, a first primary part request for the primary part, process, or assembly;

generating a first primary part request for the primary part, process, or assembly and transmitting the first primary part request to at least one primary vendor company;

receiving, from the at least one primary vendor company, a bid for the first primary part request, the bid specifying at least one dependency, the at least one dependency comprising at least one part not available from the at least one primary vendor company, the at least one part corresponding to the first part;

incorporating the first part into the initial production map as the at least one dependency to create an updated production map comprising a modified graph database;

assigning details for the at least one dependency based on the first part manufacturing template, wherein at least some details for the at least one dependency are not accessible by the second user at the second user interface device;

generating an alert to the second user, wherein the modified graph database facilitates the alert to the second user based on a relationship in the updated production map not present in the second database.

2. The method of claim 1, wherein, upon accepting an order placed by the second user at the second user interface device, the first vendor delivers completed instances of the first part directly to the second user in accordance with the first part manufacturing template.

3. The method of claim 2, wherein the first part manufacturing template defines terms for any order placed by the second user.

4. The method of claim 1, further comprising monitoring the manufacturing process for the first part and recording analytics associated with the manufacturing process for the first part in the second database, the analytics being associated with interactions between the second user and the first vendor, and providing access to the analytics to the first user at the first user interface device and withholding access to the analytics to the second user at the second user device.

5. The method of claim 4, wherein the analytics comprise statistics related to numbers of part revisions, delivery time, part conformance, and order conformance.

6. The method of claim 5, wherein the analytics stored in the database include data for all instances of the first part placed with the first vendor based on the first part manufacturing template, regardless of which user placed a corresponding order.

7. The method of claim 5, wherein the statistics related to delivery time comprise statistics comparing actual delivery time to projected delivery time.

8. The method of claim 1, wherein the first part request is an RFQ, an RFP, or a request for tender.

9. A method for resolving manufacturing dependencies, the method comprising:

creating a production map for a primary part, process, or assembly, the production map comprising a graph database;

generating a first part request for the primary part, process, or assembly;

transmitting the first part request to at least one vendor company;

receiving, from the at least one vendor company, a preliminary bid for the first part request, the bid specifying at least one dependency, the at least one dependency comprising a secondary part, process, or assembly not manufactured by the at least one vendor company;

incorporating the at least one dependency into the graph database of the production map;

generating a secondary part request associated with any of the at least one dependency that has not been resolved;

transmitting the secondary part request to at least one additional vendor company;

receiving from the at least one additional vendor company a bid for the secondary part request;

incorporating details associated with the bid for the secondary part request into the graph database of the production map;

wherein the graph database of the production map identifies:

the primary part, process, or assembly;

the at least one dependency of the first bid comprising a secondary part, process, or assembly; and at least one secondary dependency included in a bid for a secondary part request associated with the secondary part, process, or assembly, the at least one secondary dependency comprising a tertiary part, process, or assembly; and wherein a secondary vendor at a second vendor interface device associated with the secondary part request has access to the tertiary part, process, or assembly, but does not have access to the secondary part, process, or assembly in the graph database of the production map, triggering an alert to the secondary vendor based on a relationship in the graph database of the production map not visible to the secondary vendor.

10. The method of claim 9 further comprising assigning a value to the at least one dependency upon incorporating the at least one dependency into the graph database of the production map, generating a bid for manufacturing of the primary part, process, or assembly, the bid including the value for the at least one dependency, and replacing the value previously assigned to the dependency with a value drawn from the corresponding bid for the secondary part request.

11. The method of claim 10, wherein the bid previously generated in response to the first part request remains valid after replacing the value previously assigned to the dependency.

12. The method of claim 10, the method further comprising assigning a value to the at least one secondary dependency; and wherein the value assigned to the at least one secondary dependency is included in the bid for the secondary part request, and wherein details associated with the tertiary part, process, or assembly are incorporated into the graph database of the production map.

13. The method of claim 12, wherein part requests are generated for any secondary dependencies specified, and bids are received in response to each such part request, and wherein the process repeats until bids are received without any further dependencies.

14. The method of claim 10, wherein the value assigned to the dependency is drawn from a second database of publicly available options for parts, processes, or assemblies corresponding to the secondary part, process, or assembly.

15. The method of claim 14, wherein the value drawn from the second database of publicly available options is automatically incorporated into the graph database of the production map where parameters of the dependency correspond to parameters associated with the value in a database record.

16. The method of claim 9, wherein the first part request identifies a provider for the secondary part, process, or assembly, and wherein the at least one of the at least one dependency is resolved by the provider for the secondary part, process, or assembly.

17. The method of claim 16, wherein the secondary part, process, or assembly is specified in a first part manufacturing template, the part manufacturing template defining the provider for the secondary part, process, or assembly, and wherein the part request includes permissions to be granted to the at least one vendor company to order the secondary part, process, or assembly from the provider based on the part manufacturing template, and wherein the details associated with the first part manufacturing template are incorporated into the graph database of the production map.

18. The method of claim 9, wherein a first party at a first user interface device associated with the first part request has access to all contents of the graph database of the production map, and a vendor at a first vendor interface device associated with the first part request has access to the secondary part, process, or assembly and the tertiary part, process, or assembly.

19. The method of claim 9, wherein the first part request is an RFQ, an RFP, or a request for tender.

20. The method of claim 9, wherein the created graph database of the production map defines a primary part, process, or assembly, provided by the at least one vendor company, and at least one secondary part, process, or assembly provided by a secondary vendor different than the at least one vendor company, and wherein, upon receiving an indication that the secondary vendor cannot provide the secondary part, process, or assembly, generating a secondary part request for the secondary part, process, or assembly, and transmitting the secondary part request to at least one tertiary vendor.

21. The method of claim 9, wherein the first part request is an RFQ or an RFP and the secondary part request is an offer for tender.

22. The method of claim 9, wherein the created graph database of the production map defines a primary part, process, or assembly, provided by the at least one vendor company, and at least one secondary part, process, or assembly provided by a secondary vendor different than the at least one vendor company, and wherein the created graph database of the production map further defines at least one tertiary vendor capable of providing the at least one secondary part, process, or assembly, and wherein, upon receiving an indication that the secondary vendor cannot provide the secondary part, process, or assembly, replacing the secondary vendor with the tertiary vendor in the created graph database of the production map.

23. The method of claim 10, wherein the value assigned to the dependency is based on a bid in response to a part request issued by the at least one vendor company.

* * * * *